Dec. 2, 1958    J. STOEHR    2,862,353
HYDRAULIC COUPLING
Filed Oct. 7, 1954    2 Sheets-Sheet 2

INVENTOR:
JEAN STOEHR
BY  *Karl F. Ross*
AGENT

United States Patent Office 2,862,353
Patented Dec. 2, 1958

2,862,353

HYDRAULIC COUPLING

Jean Stoehr, Tananarive, Madagascar

Application October 7, 1954, Serial No. 460,978

5 Claims. (Cl. 60—12)

The present invention relates to a hydraulic coupling between a motor and an object which it actuates, such as a machine tool, driving wheels of a vehicle, etc.

More particularly, the invention concerns a hydraulic transmission or coupling between a motor and a load, this coupling having a gearing pump with a high flow capacity which is driven by the motor, and a turbine, the pump discharging a non-compressible driving liquid into the turbine in accordance with the rotation of the load, thus effecting a particularly flexible transmission between the motor and the load.

According to a characteristic of the invention, the turbine, which is able to rotate in two opposing directions, has two orifices. The first orifice is connected with the discharge outlet of the pump when the turbine rotates in one of these directions, and the second orifice is connected to this outlet when the turbine rotates in the reverse direction, so that the rotation of the turbine, and of the load which is linked to it, may be reversed at will by connecting the pump outlet to one or the other of these orifices.

Another characteristic of the invention resides in the provision of means for regulating the flow of the liquid sent to the turbine by the pump, so as to vary accordingly the speed of this turbine and also that of the load.

The invention applies equally to the characteristics described hereunder and to their different possible combinations.

Figure 1:
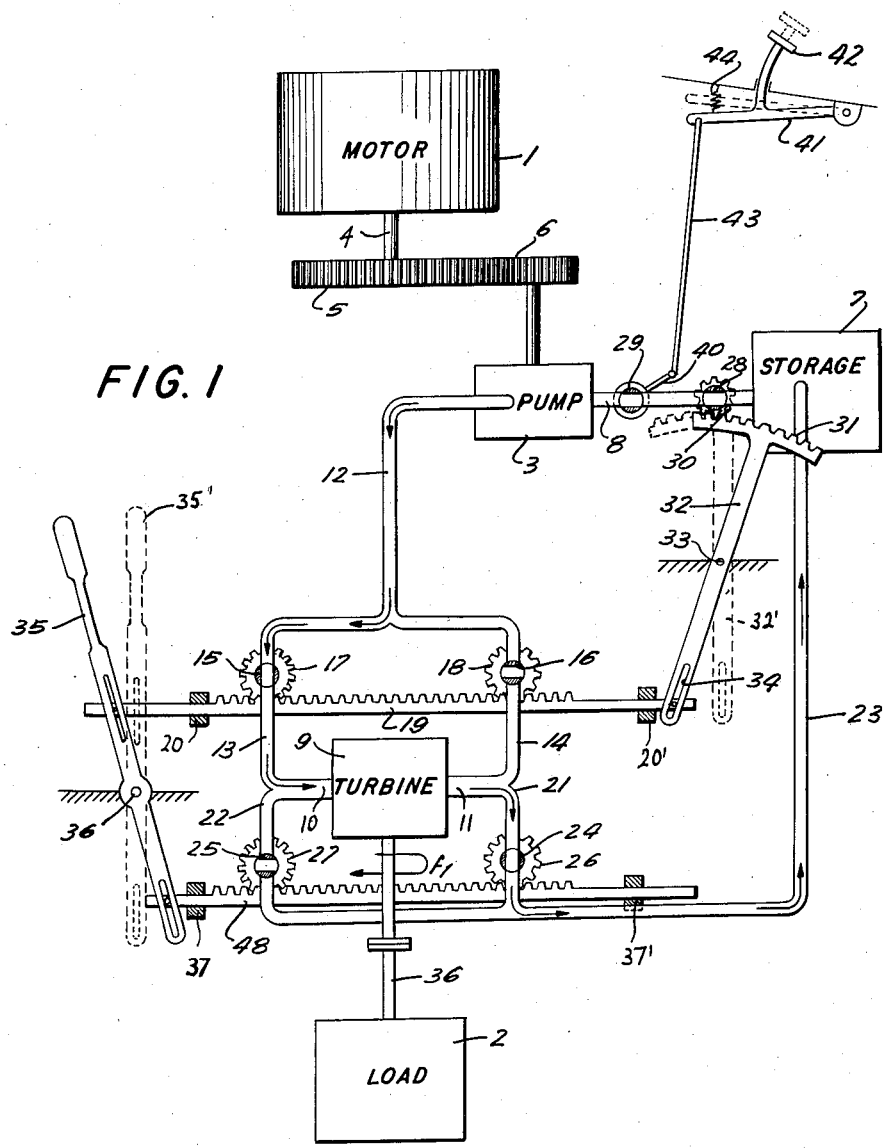
Figure 2:
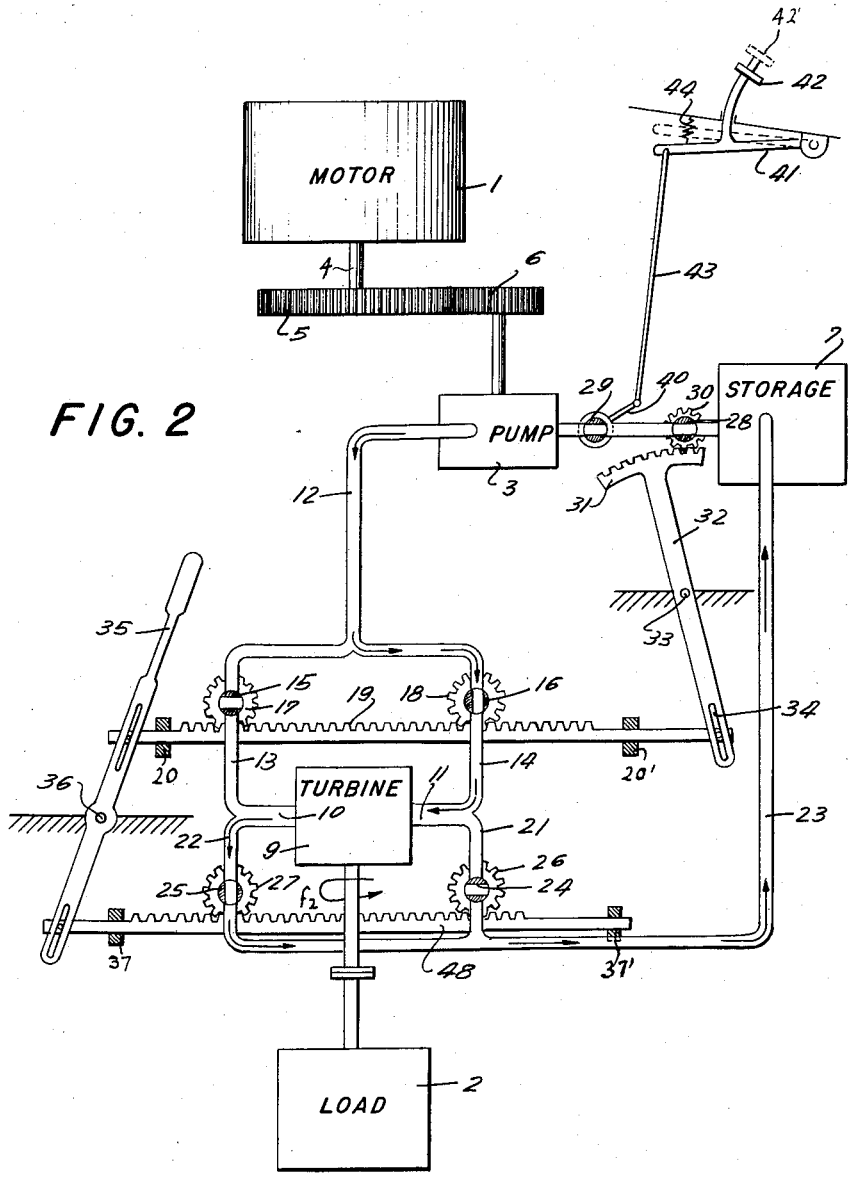

A hydraulic coupling illustrative of the invention is represented, as an example, on the accompanying drawing in which:

Fig. 1 is a schematic plan view of the appliance, the movable parts being in a starting position; and Fig. 2 is a schematic plan view of the same appliance, the movable parts being in a reversed position.

The hydraulic coupling represented in Figs. 1 and 2 is interposed between a motor 1, which may be of a known type, and a load 2 which may be either a machine tool, a differential housing, or any other machine or installation.

This coupling is made up of a pump 3 driven by the shaft 4 of the motor 1 by means of a pinion 5, 6.

The pump 3 receives or draws in a non-compressible driving liquid taken from a reservoir 7 by a pipe 8, and discharges this liquid into a turbine 9 via a connecting tube 12, which branches out into two conduits 13, 14 respectively connected with tubulures 10, 11 of the turbine 9. These conduits are provided with respective valves 15, 16 which are opened and closed by corresponding pinions 17, 18 in mesh with a common rack 19. This rack slides in the framework 20 and 20' (shown schematically) and is actuated by a lever control 35 which pivots on a pin 36.

Each tubulure 10, 11 of the turbine 9 connects with a corresponding outlet conduit 21, 22, and these outlet conduits open into a common pipe 23, which discharges the liquid escaping from the turbine 9 back into the container 7. The flow of the discharging liquid into these outlet conduits is controlled by valves 24, 25, which are actuated by respective pinions 26, 27 in mesh with rack 48 sliding in the framework 37 and 37' (shown schematically).

Two additional valves 28 and 29 control the liquid flow in pipe 8 which connects the reservoir 7 with the pump 3. The first of these, valve 28, is opened and closed by a pinion 30 meshing with a sector gear 31, which in turn is attached to an arm 32 fulcrumed on a pin 33. At its other end, arm 32 is linked with the rack 19 by means of a slot coupling 34. The second valve 29 is operated by a lever 41, rigid with the accelerator pedal 42, acting on a connecting rod 43 which is linked with a crank 40 controlling the valve. This pedal lever 41 is brought back to its initial or rest position by a spring 44.

The mechanism of the invention described above operates in the following way:

The motor 1 actuates the pump 3 by means of the gear wheels 5 and 6.

(a) Dead center

The lever 35 is in the intermediate or neutral position between that of Fig. 1 and that of Fig. 2, as indicated by dotted line 35' in Fig. 1. The arm 32 is also in the neutral position indicated by dotted line 32' in Fig. 1, so that valve 28 is closed and pump 3 is running idle, without discharging any liquid into the turbine 9. For this position, valve 29 may be slightly open, as a result of limited pressure upon the accelerator pedal which causes a progressive opening of this valve but has no effect on the flow since valve 28 is closed. Valves 15 and 24 are closed, while valves 16 and 25 are open.

(b) Forward motion

The lever 35 is brought to the position of Fig. 1 thus causing racks 19 and 48 to slide to the left and right, respectively, and arm 32 to pivot in the opposite direction to that of lever 35 and sector gear 31 completely opens valve 28; this motion of the racks also results in the opening of inlet valve 15 and outlet valve 24 and, simultaneously, in the closing of inlet valve 16 and outlet valve 25.

Thus in the forward position (Fig. 1) the liquid flows in the direction of the arrows from pump 3 through conduit 12 past valve 15, entering turbine 9 through conduit 13 and tubulure 10. The turbine revolves in the direction of arrow $f_1$, and the liquid flows out of the turbine through tubulure 11 into outlet pipe 21, thence past valve 24 into conduit 23 and back to reservoir 7.

(c) Reverse motion

Control lever 35 is pushed into the position represented in Fig. 2, and when it passes its neutral position 35' (Fig. 1) the driving mechanism is disconnected owing to the closing of valve 28, thus cutting off the fluid flow from reservoir 7.

When the lever 35 reaches its extreme position at the right (Fig. 2), valve 28 is again opened, as are inlet valve 16 and outlet valve 25, while inlet valve 15 and outlet valve 24 are closed. Accordingly, in the reverse position (Fig. 2) the liquid flows in the direction of the arrows from the pump 3 into conduit 12, past valve 16, into conduit 14 and tubulure 11, past the turbine, and thence into tubulure 10, and conduit 22, returning to the reservoir 7 via conduit 23.

Turbine 9 then revolves in the direction of the arrow $f_2$, which is opposite to that of the arrow $f_1$.

(d) Acceleration

The rest position 42' of the accelerator pedal 42, represented by dotted lines in Figs. 1 and 2, corresponds to a small opening of the acceleration valve 29. If the accelerator pedal is further depressed, valve 29 is completely opened, thereby increasing the flow into and discharge from the pump 3 and, as a natural consequence, the speed of the turbine 9.

*(e) Disengagement*

Lever 35 is brought to its neutral position 35' (dotted lines in Fig. 1), which produces, by means of the sector gear 31, the closing of valve 28. The pump 3 then ceases to discharge liquid into turbine 9, which stops.

Disengagement is also accomplished by permitting accelerator pedal 42 to return to its rest position 42', under the action of the spring 44 upon lever 41, thus effectively closing valve 29 and preventing the flow of liquid into the pump.

The above-described hydraulic coupling presents the following technical advantages:

(1) Clutching is effected by progressively opening valve 28, thereby increasing the flow of the discharged liquid into pump 3 and so to turbine 9. Any type of friction clutch, which is susceptible of rapid wear, is thus eliminated.

(2) Turbine 9, whose speed of rotation is a function of the flow of the admitted liquid, can be controlled by regulating valve 29, thereby providing a simple control of the load 2. Thus the coupling permits the elimination of speed-changing gears and presents, in comparison with the usual transmission, the advantage of permitting a progressive and continuous variation of that speed.

(3) Control lever 35 permits speed reversals with progressively variable velocities in both directions.

The invention notably extends to the characteristics described hereunder and to their different possible combinations:

I claim:

1. A hydraulic coupling between a motor and a load driven by said motor, comprising a source of non-compressible driving fluid, a pump coupled to said motor for continuous actuation thereby, first conduit means between said source and said pump for supplying fluid to the latter, a reversible turbine coupled with said load, second conduit means connecting said turbine in a forward circuit for said fluid between said pump and said source for driving said turbine in one sense of rotation, third conduit means connecting said turbine in a reverse circuit for said fluid between said pump and said source for driving said turbine in the opposite sense of rotation, a control member having a forward position, an intermediate position and a reverse position, first, second and third valve means in said first, second and third conduit means respectively, link means so connecting said control member to said first valve means as to close the latter in said intermediate position of said member, thereby shutting off the flow of said fluid from said source to said pump, said link means so connecting said control member to said second valve means as to open the latter in said forward position of said member, thereby rendering operative said forward circuit, and so connecting said lever member to said third valve means as to open the latter in said reverse position of said member, thereby rendering operative said reverse circuit.

2. A hydraulic coupling according to claim 1, wherein said link means comprises pinion means connected to each of said valve means and toothed actuator means engaged by said member and meshing with said pinion means.

3. A hydraulic coupling according to claim 2, wherein said second valve means comprises a pair of pinion-controlled valves in different parts of said forward circuit and said third valve means comprises a pair of pinion-controlled valves in different parts of said reverse circuit, said control member being a pivoted lever, the actuator means for said second and third valve means comprising a pair of racks connected to said lever on opposite sides of its pivot, each of said racks meshing with a pinion of a respective valve in said forward circuit and with a pinion of a respective valve in said reverse circuit.

4. A hydraulic coupling according to claim 3, wherein the actuator means for said first valve means comprises a sector gear operatively coupled with one of said racks.

5. A hydraulic coupling according to claim 1, further comprising fourth valve means in said first conduit means in series with said first valve means, and means independent of said control member for varying the rate of flow of said fluid from said source to said pump by operating said fourth valve means.

References Cited in the file of this patent
UNITED STATES PATENTS
2,626,001    Antle _____ Jan. 20, 1953